United States Patent
Brandt et al.

(10) Patent No.: US 12,335,553 B2
(45) Date of Patent: Jun. 17, 2025

(54) VIDEO PROCESSING DEVICE AND MANIFEST FILE FOR VIDEO STREAMING

(71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Aschwin Steven Reinier Brandt, The Hague (NL); Bastiaan Wissingh, Leiden (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 0 days.

(21) Appl. No.: 17/788,225

(22) PCT Filed: Dec. 24, 2020

(86) PCT No.: PCT/EP2020/087850
§ 371 (c)(1),
(2) Date: Jun. 22, 2022

(87) PCT Pub. No.: WO2021/130355
PCT Pub. Date: Jul. 1, 2021

(65) Prior Publication Data
US 2023/0026014 A1 Jan. 26, 2023

(30) Foreign Application Priority Data
Dec. 24, 2019 (EP) .................................... 19219597

(51) Int. Cl.
*H04N 21/278* (2011.01)
*H04N 13/194* (2018.01)
(Continued)

(52) U.S. Cl.
CPC ......... *H04N 21/278* (2013.01); *H04N 13/194* (2018.05); *H04N 21/2353* (2013.01); *H04N 21/4524* (2013.01); *H04N 21/816* (2013.01)

(58) Field of Classification Search
CPC .............. H04N 21/278; H04N 13/194; H04N 21/2353; H04N 21/4524; H04N 21/816;
(Continued)

(56) References Cited

U.S. PATENT DOCUMENTS 9,516,225 B2 12/2016 Banta et al.
10,062,414 B1 * 8/2018 Westphal ............... G11B 27/10
(Continued)

FOREIGN PATENT DOCUMENTS

EP 3629585 A1 4/2020
GB 2550587 A * 11/2017 ....... H04N 21/21805
(Continued)

OTHER PUBLICATIONS

Begen et al, "Metrics and SAND Messages for DASH-VR," ISO/IEC JTC1/SC29/WG11 MPEG 118/m40333, Apr. 2017.
(Continued)

*Primary Examiner* — Fernando Alcon
(74) *Attorney, Agent, or Firm* — Hamilton, Brook, Smith & Reynolds, P.C.

(57) ABSTRACT

One aspect of this disclosure relates a video processing device comprising a processor for processing a manifest file for video streaming for a user. The manifest file comprises at least a plurality of positions defined for a scene that are associated with pre-rendered omnidirectional or volumetric video segments stored on a server system. The manifest file may also contain a plurality of resource locators for retrieving omnidirectional or volumetric video segments from the server system. Each resource locator may be associated with a position defined for the scene. The video processing device
(Continued)

may be configured to associate a position of the user with a first position for the scene in the manifest file to retrieve a first omnidirectional or volumetric video segment associated with the first position using a first resource locator from the manifest file.

17 Claims, 7 Drawing Sheets

(51) Int. Cl.
  *H04N 21/235* (2011.01)
  *H04N 21/45* (2011.01)
  *H04N 21/81* (2011.01)
(58) Field of Classification Search
  CPC ............... H04N 13/117; H04N 13/279; H04N 21/234345; H04N 21/472; H04N 21/4728; H04N 21/6125; H04N 21/6175; H04N 21/6587; H04N 21/84; H04N 21/8455; H04N 21/8456; H04N 21/8586
  See application file for complete search history.

(56) References Cited

U.S. PATENT DOCUMENTS

| | | | |
|---|---|---|---|
| 10,356,387 B1* | 7/2019 | Phillips | H04N 21/816 |
| 10,419,738 B1* | 9/2019 | Phillips | H04N 21/6587 |
| 10,893,310 B1* | 1/2021 | Wu | H04N 21/2387 |
| 10,904,639 B1* | 1/2021 | Benson | H04N 21/2393 |
| 10,931,979 B2 | 2/2021 | Han et al. | |
| 11,076,162 B2 | 7/2021 | Taibi et al. | |
| 11,451,838 B2 | 9/2022 | Da Silva Pratas Gabriel et al. | |
| 11,477,470 B2 | 10/2022 | Pettersson et al. | |
| 11,523,185 B2* | 12/2022 | Stokking | H04N 21/4358 |
| 11,997,338 B1* | 5/2024 | Koceski | H04L 65/612 |
| 12,194,977 B2 | 1/2025 | Kato et al. | |
| 2011/0125919 A1 | 5/2011 | Kwon et al. | |
| 2012/0036544 A1* | 2/2012 | Chen | H04N 21/6581 725/109 |
| 2012/0242781 A1 | 9/2012 | Gautier et al. | |
| 2015/0016543 A1 | 1/2015 | Rapaka et al. | |
| 2015/0026358 A1 | 1/2015 | Zhang et al. | |
| 2015/0120819 A1 | 4/2015 | Zhang | |
| 2015/0264425 A1 | 9/2015 | Heinz, II et al. | |
| 2016/0165309 A1 | 6/2016 | Van Brandenburg et al. | |
| 2017/0013327 A1 | 1/2017 | Choi et al. | |
| 2017/0053675 A1 | 2/2017 | Dickerson et al. | |
| 2017/0118540 A1 | 4/2017 | Thomas et al. | |
| 2017/0155912 A1 | 6/2017 | Thomas et al. | |
| 2017/0316600 A1* | 11/2017 | Jeong | G06T 3/0062 |
| 2017/0332117 A1 | 11/2017 | Haritaoglu et al. | |
| 2017/0339469 A1* | 11/2017 | Trikannad | H04N 21/21805 |
| 2017/0347026 A1 | 11/2017 | Hannuksela | |
| 2018/0077210 A1 | 3/2018 | Hannuksela et al. | |
| 2018/0089903 A1 | 3/2018 | Pang et al. | |
| 2018/0097867 A1 | 4/2018 | Pang et al. | |
| 2018/0103199 A1 | 4/2018 | Hendry et al. | |
| 2018/0160160 A1 | 6/2018 | Swaminathan et al. | |
| 2018/0164593 A1* | 6/2018 | Van Der Auwera | G06F 3/013 |
| 2018/0176468 A1* | 6/2018 | Wang | G09G 5/14 |
| 2019/0014350 A1 | 1/2019 | Wang | |
| 2019/0088005 A1 | 3/2019 | Lucas | |
| 2019/0104316 A1* | 4/2019 | Da Silva Pratas Gabriel | H04N 21/6587 |
| 2019/0141311 A1 | 5/2019 | Lee et al. | |
| 2019/0174150 A1 | 6/2019 | D'Acunto et al. | |
| 2019/0313160 A1 | 10/2019 | Stokking et al. | |
| 2019/0325580 A1 | 10/2019 | Lukac et al. | |
| 2019/0373245 A1 | 12/2019 | Lee et al. | |
| 2019/0387224 A1* | 12/2019 | Phillips | H04N 19/177 |
| 2020/0037043 A1* | 1/2020 | Phillips | H04N 21/23418 |
| 2020/0118342 A1 | 4/2020 | Varshney et al. | |
| 2020/0120326 A1 | 4/2020 | Deshpande | |
| 2020/0162766 A1 | 5/2020 | Shi et al. | |
| 2021/0084278 A1 | 3/2021 | Harviainen et al. | |
| 2021/0092444 A1* | 3/2021 | Ilola | H04N 21/816 |
| 2021/0105313 A1* | 4/2021 | Wang | H04L 65/70 |
| 2021/0385514 A1 | 12/2021 | Da Silva Pratas Gabriel et al. | |
| 2021/0400314 A1 | 12/2021 | Varekamp | |
| 2022/0360828 A1* | 11/2022 | Huang | H04N 21/26258 |
| 2023/0132473 A1* | 5/2023 | Lee | H04N 13/366 382/154 |
| 2024/0031614 A1 | 1/2024 | Brandt et al. | |
| 2024/0080501 A1* | 3/2024 | Brandt | H04N 13/172 |
| 2025/0022212 A1 | 1/2025 | Brandt et al. | |

FOREIGN PATENT DOCUMENTS

| | | |
|---|---|---|
| WO | WO 2017/202899 A1 | 11/2017 |
| WO | WO 2018/172614 A1 | 9/2018 |
| WO | WO 2019/034808 A1 | 2/2019 |
| WO | 2019/043025 A1 | 3/2019 |
| WO | WO 2019/066191 A1 | 4/2019 |
| WO | WO 2019/110779 A1 | 6/2019 |
| WO | 2019/195101 A1 | 10/2019 |
| WO | 2020/036384 A1 | 2/2020 |
| WO | 2022/069445 A1 | 4/2022 |
| WO | 2023/099383 A1 | 6/2023 |

OTHER PUBLICATIONS

D'Acunto et al, "MPD signalling of 360 content properties forVR applications," ISO/IEC JTC1/SC29/WG11 MPEG2016/h138605, May 2016.
International Standard, Information technology—Dynamic Adaptive Streaming Over HTTP (DASH)—Part 1: Media Presentation Description and Segment Formals ISO/IEC 23090-1, Third Edition (Aug. 2019).
International Standard, Information technology—Coded representation of immersive media—Part 2: Omnidirectional media format ISO/IEC 23090-2, First Edition (Jan. 2019).
International Standard, "Information technology—Dynamic adaptive streaming over HTTP (DASH)," Part 5: Server and network assisted DASH (SAND), ISO/IEC 23009-5, First edition (Feb. 2017).
Information technology—MPEG systems technologies—Part 10: Carriage of Timed Metadata Metrics of Media in ISO Base Media File Format (2015).
Krishnamoorthi, V., et al., "Empowering the Creative User: Personalized HTTP-Based Adaptive Streaming of Multi-Path Nonlinear Idea." In Proceedings of the 2013 ACM SIGCOMM workshop on Future human-centric multimedia networking, pp. 53-58 (2013).
Wikipedia contributors, "Euler angles," *Wikipedia, the Free Encyclopedia*, https://en.wikipedia.org/w/index.php?title=Euler_angles&oldid=920247849 (accessed Oct. 29, 2019).
Barnard, Dom., "Degrees of Freedom (DoF): 3-DoF vs 6-DoF for VRHeadset Selection," Retrieved from the internet URL: https://virtualspeech.com/blog/degrees-of-freedom-vr (May 5, 2019).
Wikipedia contributors, "Content delivery network," *Wikipedia, the Free Encyclopedia*, https://en.wikipedia.org/w/index.php?title-Content_delivery_network&oldid=922913646 (accessed Oct. 29, 2019).
Wikipedia contributors, "NAT traversal," *Wikipedia, the Free Encyclopedia*, https://en.wikipedia.org/w/index.php?title=NAT_traversal&oldid-902410582 (accessed Oct. 29, 2019).
Song, Seulki, et al., "Free-Viewpoint Relationship Description Based Streaming Systems for Arbitrary View Switching." 2018 Tenth International Conference on Ubiquitous and Future Networks (ICUFN) (2018): 738-740.
Corbillon, Xavier, et al. "Dynamic adaptive streaming for multi-viewpoint omnidirectional videos." In *Proceedings of the 9th ACM Multimedia Systems Conference*, pp. 237-249. ACM, 2018.
Zhao, Mincheng, et al., "A cloud-assisted DASH-based scalable interactive multiview video streaming framework." In *2015 Picture Coding Symposium (PCS)*, pp. 221-226. IEEE, 2015.
Huang, Jingwei, et al., "6-DOF VR videos with a single 360-camera." In *2017 IEEE Virtual Reality (VR)*, pp. 37-44. IEEE, 2017.

(56) References Cited

OTHER PUBLICATIONS

Pantos, R., et al., "HTTP Live Streaming," Retrieved from the internet URL: https://tools.ietf.org/html/rfc8216 (Aug. 2017).
Roberto Lopez-Gulliver, et al., "Synthesis of Omnidirectional Movie using a Set of Key Frame Panoramic Images" IEEE, Virtual Reality Conference (2015).
Information technology—Coding of audio-visual objects—Part 19: Common media application format (CMAF) for segmented media, the Third Edition of 23009-1. (2018).
Hughes, K., and Singer, D., "Draft of FDIS of ISO/IEC 23000-19 Common Media Application Format for Segmented Media," ISO/IEC JTC1/SC29/WG11 Coding of Moving Pictures and Audio (2017).
Information Technology—Dynamic Adaptive Streaming Over HTTP (DASH)—Media Presentation Description and Segment Formats, ISO/IEC—23009-01 (Aug. 2019).
Coding of Moving Pictures and Audio, ISO/IEC JTC 1/SC 29/WG 11, Text of ISO/IEC DIS 23090-5 Video-based Point Cloud Compression (Oct. 2019).
Coding of Moving Pictures and Audio, ISO/IEC JTC 1/SC 29/WG 11, Technologies under Consideration for ISO/IEC DIS 23090-2 (OMAF) $2^{nd}$ Ed. (Nov. 2019).
EP Search Report for EP Application No. EP 19219597.2, entitled: Video Processing Device and Manifest File for Video Streaming, date of report: Jun. 15, 2020.
International Search Report and Written Opinion for PCT/EP2020/087850, entitled: Video Processing Device and Manifest File for Video Streaming, Date of Mailing: Feb. 24, 2021.

3rd Generation Partnership Project; Technical Specification Group Services and System Aspects; Virtual Reality (VR) media services over 3GPP; (Release 14), 3GPP Draft: S4-170125 TR 26.918 V0.5.0 (Jan. 2017), Jan. 27, 2017,44 pages.
Attal, B. et al., "MatryODShka: Real-time 6DoF Video View Synthesis Using Multi-sphere Images," European Conference on Computer Vision, 25 pages, Lecture Notes in Computer Science (2020).
GauGAN: Semantic Image Synthesis with Spatially Adaptive Normalization, Jul. 2019, ACM SIGGRAPH 2019 Real-Time Live.
Hamza A. et al., "A DASH-based Free Viewpoint Video Streaming System", Proceedings of Network and Operating System Support on Digital Audio and Video Workshop, Mar. 19, 2014, pp. 55-60.
Li, Ming Jing, et al., "Multipleviews of regions of interest," ISO/IEC JTC1/SC29/WG11, MPEG2013/m31167 (Oct. 2013).
Misra, K., et al., "An Overview of Tiles in HEVC," IEEE Journal of Selected Topies in Signal Processing, 7(6): 969-977 (Dec. 2013).
Ostermann, "Potential improvement for OMAF," Coding of Moving Pictures and Audio, ISO/IEC JTC1/SC29/WG11, N19435, (Jul. 30, 2020).
Su, T., et al., "A DASH-based HEVC multi-view video streaming system," Journal of Real-Time Image Processing, 12(2): 329-342 (Aug. 2016).
Thomas, Emmanuel, et al., "On source content in OMAF," ISO/IEC JTC1/SC29/WG11, MPEG2016/m41440 {Oct. 2017).
Yamamoto, T. et a., "Analysis on MPEG-I Architectures", 125 Mpeg Meeting; Jan. 14, 2019-Jan. 19, 2019; Marrakech; (Motion Picture Expert Group or ISO/IEC JTC1/SC29/WG11), No. M45929, Jan. 13, 2019, XP030214334.

* cited by examiner

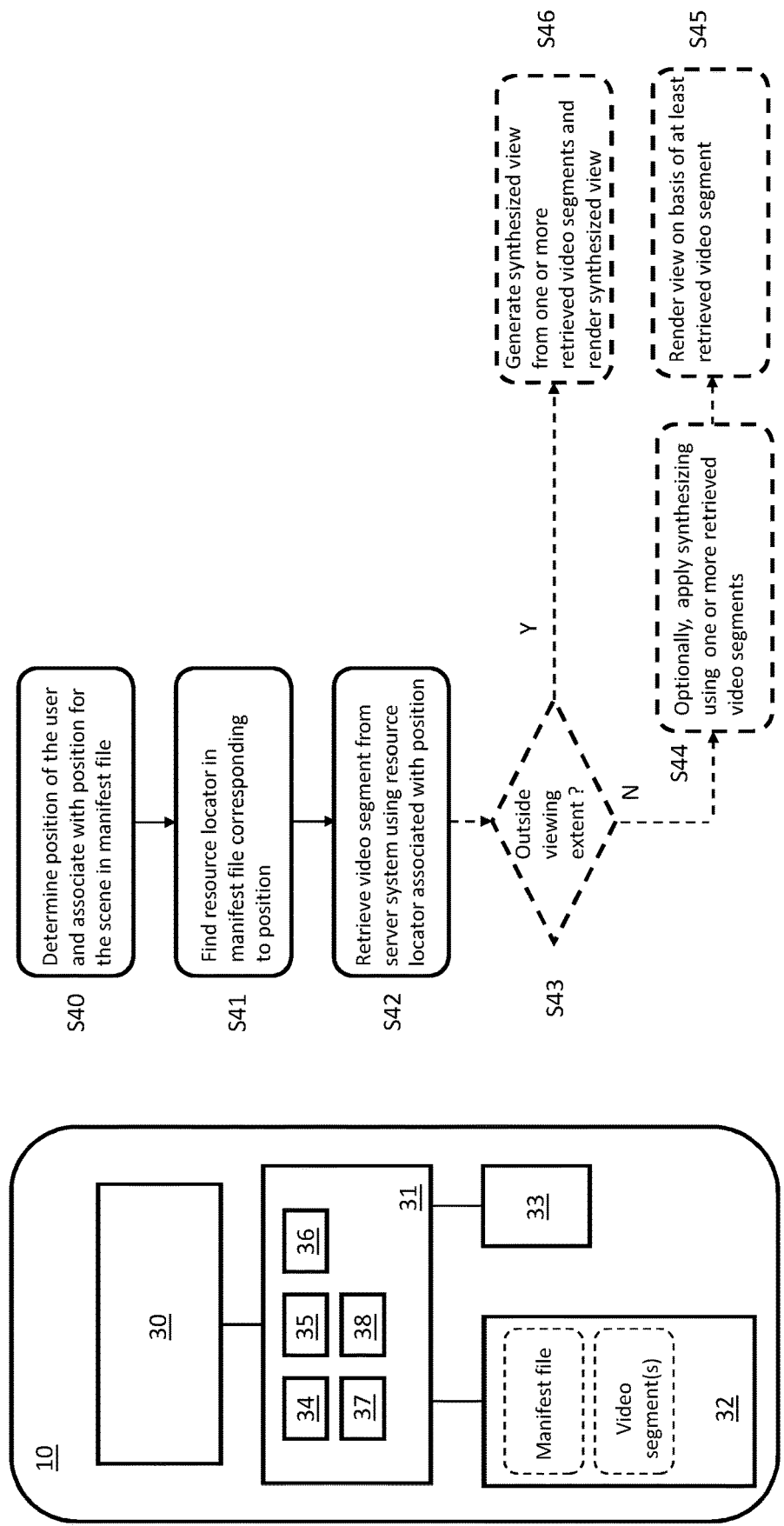

VIDEO PROCESSING DEVICE AND MANIFEST FILE FOR VIDEO STREAMING

This application is the U.S. National Stage of International Application No. PCT/EP2020/087850, filed Dec. 24, 2020, which designates the U.S., published in English, and claims priority under 35 U.S.C. § 119 or 365 (c) to European Application No. 19219597.2, filed Dec. 24, 2019. The entire teachings of the above applications are incorporated herein by reference.

FIELD OF THE INVENTION

This disclosure relates to a video processing device and manifest file for video streaming. In particular, the disclosure relates to a video processing device comprising a processor for processing a manifest file for video streaming. The disclosure also relates to a server system and a video streaming system.

BACKGROUND

Over the past years, interest in advanced video experience including augmented reality and virtual reality (together referred to as XR for eXtended Reality) has seen a sharp increase. Capturing images of the world has evolved from recording a single view on a plane with photography to recording a sphere providing an omnidirectional view with a 360 degrees video camera to nowadays recording a volume with volumetric media capture technologies such as point clouds, meshes with textures and light fields.

The current trend to record and stream this visual media is to transform the source content in a 2D video format to leverage existing video compression techniques (video codecs, multiplexers and transmission protocols). The ISO/IEC 23090 part 5: Video-based Point Cloud Compression (V-PCC) is an example of this trend wherein point cloud objects and their attributes are mapped onto a 2D frame for being compressed by a video encoder. Although this approach has benefits when each content type is captured individually, it is not conceivable in the near future to have multiple 4K (or higher) parallel video decoders running on a small device like a smartphone for decoding a complex scene of 4 to 10 objects.

As the capturing dimensions increase from plane to sphere, the ability for the user to consume the captured media with a higher degree of freedom has also emerged. For 360 degree video, an application is considered to offer three degrees of freedom (3 DoF) which corresponds to the typical Euler angles when considering the rotation of rigid bodies. For volumetric media, the natural associated degree of freedom is six, referred to as 6 DoF, adding translation of the rigid body on the three spatial axis, x, y and z in addition to the rotations.

Multiview video is a media format wherein a scene is captured by multiple cameras from different viewpoints and which allows the viewer to switch the viewpoint during playback. The article "A Cloud-assisted DASH-based Scalable Interactive Multiview Video Streaming Framework" by Zhao et al (electronic ISBN 978-1-4799-7783-3) discloses a system wherein all views are encoded using scalable video coding (SVC) to facilitate DASH transmission. For deciding where to perform the view synthesis (server or client) the system adaptively makes the decision based on network conditions and costs of view synthesis in the cloud.

SUMMARY

It is an object of the present disclosure to define a format for video streaming and a video processing device that can process this format as well as a server system configured for delivering or distributing the video stream to the video processing devices comprising omnidirectional or volumetric video segments.

Hence, in one aspect, the present disclosure pertains to a video processing device comprising a processor for processing a manifest file for video streaming for a user. It should be appreciated that a user may be a person or a machine, such as a robot, a computer program etc. The manifest file comprises at least a plurality of positions defined for a scene that are associated with pre-rendered omnidirectional or volumetric video segments stored on a server system, for example a remote server system. The positions may be identified by means of position indicators. In addition, the manifest file may contain a plurality of resource locators, for example URLs, for retrieving omnidirectional or volumetric video segments from the server system. Each resource locator may be associated with a position defined for the scene. The video processing device may be configured to associate a position of the user with a first position for the scene in the manifest file to retrieve a first omnidirectional or volumetric video segment associated with the first position using a first resource locator from the manifest file. The first position may correspond to any position for the scene and is not necessarily the initial position for starting playback of the video.

In another aspect, the present disclosure relates to a manifest file for processing a video stream by a video processing device. The manifest file contains a plurality of positions defined for a scene that are associated with pre-rendered omnidirectional or volumetric video segments stored on a server system. The manifest file may also contain a plurality of resource locators for retrieving omnidirectional or volumetric video segments from the server system, wherein each resource locator of the plurality of resource locators is associated with a position defined for the scene.

In yet another aspect, the disclosure also relates to a server system having access to a manifest file as disclosed herein, wherein the server system is further configured to receive requests from a video processing device for omnidirectional or volumetric video segments identified by the resource locators in the manifest file as disclosed herein.

In one further aspect, the disclosure also relates to a video streaming system comprising a server system and at least one video processing device as disclosed herein.

Other aspects of the present disclosure pertain to a computer-implemented method for video processing and to computer program product that contains software code portions for executing the method when executed by a video processing device.

The present disclosure defines a manifest file that associates positions for a scene with omnidirectional or volumetric video segments that are retrieved from the server system when a user is in a certain position. The manifest file may define the position of the cameras and does not require a description of an entire scene with positions of objects in it. A large city or an 8 m$^2$ room would require the same amount of data to be described as long as the same number of camera positions is used in the manifest file.

By receiving the segments associated with a particular camera position only when requested, i.e. when the user is in a particular position, an existing streaming infrastructure can be used for XR applications applying streaming video similar to that used for HTTP Adaptive Streaming (HAS), which is advantageous for the stateless and scalable nature of the server system.

The user position may be a real position (wherein the user, for example, wears an AR or VR device and is in a certain position) or a virtual position of for example a controller input, e.g. a game controller or a mouse pointer controller by a user. It should be appreciated that the positions in the manifest file may be defined in an implicit manner, for example by referring to a camera position or viewing extent as explained in further detail below.

The omnidirectional video segments or volumetric video segments are video segments that have been captured before for the scene by cameras located at the positions defined in the manifest file or have been generated from a computer-generated 3D scene, e.g. from a game engine such as Unity, a 3D scene description such as Universal Scene Description (USD) or OpenSceneGraph (OSG).

As is known in the art, omnidirectional video or 360 degree video capturing offers an application three rotational degrees of freedom (3 DoF), while volumetric video (e.g. immersive video) allows some translational movement of the user without requiring image warping techniques such as zoom or shift operations by the video processing device. Volumetric video formats essentially allow rendering a scene in a stereoscopic manner, i.e. each eye sees the scene from a slight displacement which corresponds to the inter-pupil distance (IPD), the distance between the user's eyes. Pure omnidirectional videos may be limited regarding these aspects by the phenomenon of occlusion and the lack of depth information.

It should be appreciated that the manifest file may use a structure, e.g. a regular or irregular grid, to define the positions of the cameras or viewing extents thereof. One example of such a structure is a block structure wherein normalized blocks are used. The positions may be defined with this structure and distances between the positions or viewing extents in the manifest file and distances between the position of the (user of the) video processing device and the positions defined in the manifest file can be obtained using this structure. The structure may also define the boundaries of the space where the user is expected to move when enjoying the video scene which may be referred to as a navigation space. When a boundary of the navigation space is crossed, the user may be alerted by the application rendering the view for the user as will be described in further detail below.

It is further noted that the present disclosure generally refers to a scene when capturing the real world image by cameras or defining the scene by a computer. The result of the captured scene is a video scene that can be enjoyed by a user using the video processing device. The video scene may comprise one or more views.

In one embodiment, one or more positions in the manifest file are associated with a viewing extent within which the video processing device is capable of processing the retrieved omnidirectional or volumetric video segment to render a view for a user by e.g. image warping techniques. In one example of this embodiment, the positions in the manifest file are defined by or as the viewing extent.

In one embodiment, a manifest file is disclosed, wherein each position in the manifest file is associated with a viewing extent, e.g. defined by or as the viewing extent.

The viewing extent is a two-dimensional area (also referred to in the present disclosure as a pre-rendered video area, PRVA) or three-dimensional volume (also referred to as a pre-rendered video volume PRVV) representing an extended position in the manifest file. It should be appreciated that the viewing extents may or may not overlap. It should also be appreciated that the viewing extent may depend on the type of scene. When many objects are close to the user, the viewing extent may be smaller than when the scene is an open space without any or with very few objects.

These embodiments enable some freedom of motion for the user by relying on conventional video processing operations like zooming (to simulate moving in a certain direction, for example), shifting, etc., generally referred to as image warping, for the retrieved omnidirectional or volumetric video segment by the video processing device. Accordingly, an appropriate view for a user can still be rendered when relatively small movements of the user from the precise camera positions occur.

In one embodiment, the video processing device is configured to generate a synthesized view or receive a generated synthesized view, wherein the synthesized view is generated on the basis of one or more frames of at least the retrieved first pre-rendered omnidirectional or volumetric video segment. The synthesized view may be further generated on the basis of a model description of a part of the scene associated with the first position defined for the scene, e.g. when the user is within the first viewing extent. Model descriptions will be discussed in further detail below.

Alternatively or in addition, one or more frames of a second omnidirectional or volumetric video segment (retrieved for example for a second position defined for the scene using a second resource locator associated with this second position) can be used for generating the synthesized view when the position of the user corresponds with the first position defined for the scene, e.g. when the user is within the first viewing extent. Synthesizing when the position of the user corresponds to a position defined for the scene may increase the quality of the rendered view.

When viewing extents overlap for a substantial part of the scene, the video processing device is able to retrieve omnidirectional or volumetric video segments for this part of the scene dependent on the position of the user and render a suitable and seamless view for the user by the above mentioned conventional operations for each position of the user using conventional image warping techniques. As mentioned above, synthesizing on the basis of further information may further increase the quality of the rendered view.

When the viewing extents do not overlap, additional video processing may be required, such as synthesizing of one or more frames of one or more video segments in order to present views of the video scene to the user when the position of the user does not correspond to a position defined for the scene, for example when the user is not within the viewing extent. In such case, conventional image warping techniques like zooming and shifting may not work appropriately and advanced video processing techniques as synthesizing may be applied.

In one embodiment, the video processing device is configured to generate a synthesized view in the video processing device or receive a generated synthesized view from the server system when the position of the user is outside the first position defined for the scene, e.g. when the user is outside of the first viewing extent. The synthesized view may be generated on the basis of one or more frames of the at least the retrieved first pre-rendered omnidirectional or volumetric video segment. The synthesized view may be generated based on one or more frames of one, two or more pre-rendered video segments received from the server system.

The effect of synthesizing one or more frames of different video segments enables the video processing device to render views for the user allowing the user to experience more degrees of freedom when viewing the video scene than the originally received video segments would allow without synthesizing. For example, when the video processing device receives one or more omnidirectional video segments that would allow a 3 DoF (rotation only) experience, synthesizing of one or more frames of one or more of these video segments would allow generating a 4, 5 or 6 DoF experience for the user with substantially seamless continuity of the video.

In one particular embodiment, the manifest file defines the first position associated with the first resource locator and a second position associated with a second resource locator. The video processing device is configured, when the position of the user does not correspond to the first position defined for the scene (e.g. when the user is outside the first viewing extent), to retrieve the at least one second omnidirectional or volumetric video segment from the server system using the second resource locator associated with the second position in the manifest file and may then generate the synthesized view on the basis of the retrieved first and second omnidirectional or volumetric video segments, e.g. by generating the synthesized view on the basis of one or more frames in the retrieved first and second omnidirectional or volumetric video segments.

In one embodiment, the manifest file defines at least a first resource locator and a second resource locator. The first resource locator is associated with a first position defined for the scene and the first resource locator points to the first pre-rendered omnidirectional or volumetric video segment at a server system. The second resource locator is associated with a second position for the scene and the second resource locator points to the second pre-rendered omnidirectional or volumetric video segment at the server system.

These embodiments enable generating a synthesized view on the basis of one or more frames of at least two video segments associated with different positions for the scene in the manifest file. The second video segment associated with a second position for generating the synthesized view may for example be selected on the basis of the distance between the first position and the second position and/or on the field of view of the user. If two or more viewing extents are in the field of view of the user, both viewing extents can be used for generating the synthesized view. In one a linear interpolation method may be applied, such as alpha blending wherein a weighted average alpha is used to combine one or more frames from two video segments.

In one embodiment, the manifest file defines a prohibition to use the first and second video segments, or frames thereof, in combination to generate the synthesized view. For example, in one embodiment, the manifest file contains a border type element that indicates to the video processing device whether or not generating the synthesized view on the basis of the first and second video segments, or frames thereof, is allowed.

This embodiment allows the video processing device to take into account that parts of the scene may have obstructions (e.g. a non-transparent wall) in it so that video segments associated with positions in the scene at opposite sides of the obstruction should not be used for generating a synthesized view. Properties of the border type element may be defined such as transparent and non-transparent. An example of a transparent border is, for example, a window.

For a transparent obstruction type, video segments, or frames thereof, may be combined whereas for a non-transparent obstruction type, combination is not allowed to generate the synthesized view. It should be appreciated that the prohibition, such as the border type element, may e.g. prevent that the second pre-rendered video segment is retrieved by the video processing device in order to prevent synthesizing on the basis of the first and second video segments.

In one embodiment, the application (e.g. the XR application) rendering the view may also be triggered by a border type element in the manifest file in order to signal the presence of the obstruction to the user, e.g. by means of an alert signal, such as a vibration, electrical signal, sound or visual indication such as a popup window or other visual means within the view of the user. Triggering of the alert signal may occur when the position of the user is within a certain distance from the obstruction. In particular, when a transparent type border element is defined, frames from different pre-rendered video segments may be combined but an alert signal may still need to be generated to signal to the user that the transparent border cannot be passed.

In one embodiment, the video processing device is configured to retrieve at least a part of a model description of the scene associated with at least one position in the manifest file, e.g. with at least one viewing extent. The video processing device is further configured to generate the synthesized view on the basis of at least one or more frames of the retrieved first pre-rendered omnidirectional or volumetric video segment using at least the retrieved part of the model description. The manifest file may contain a resource locator to a part of the model description associated with a position defined for the scene (e.g. a viewing extent) to enable retrieving the relevant part of the model description. This embodiment facilitates generation of the synthesized view, e.g. by providing parameters for synthesizing video segments according to a given algorithm.

The model description is normally created after capturing the scene by the cameras or generating the scene by a computer. In one example, the model allows creating more accurate images but could also be used to add tactile and haptic components to the user experience. The model may contain a depth map of the captured content which is especially of interest when creating images of objects that are closer to the user so that these can be given a perception of depth. Alternatively or in addition to the depth information the model may contain metadata about the captured environment, such as one or more properties of materials of objects in the scene. Objects could be recognized by image recognition software. This way a prediction can be made about the visual aspects of the parts of the object that may not be captured by a camera.

In one embodiment, the manifest file defines an area or volume within which the user is allowed to move and wherein the video processing device uses said area or volume as a navigation space indication. Several implementations can be considered to define the area or volume restrictions for the user. The manifest file may e.g. have an explicit definition of the area or volume wherein the user is allowed to move. Alternatively, the manifest file may define transparent or non-transparent prohibitions as discussed above around the area or volume to inform the user in some manner of reaching the confinements of the space. A variety of options also exist for the navigation space indication, including terminating video processing by the video processing device, black images or see-through images (i.e. an image from the real world environment) as an analogy to terminating play when a movie has ended after a certain amount of time.

In one embodiment, the manifest file contains at least one of an entry point and an exit point. The entry point defines a starting position enabling the video processing device to retrieve one or more initial omnidirectional or volumetric video segments using a resource locator associated with one or more corresponding positions in the manifest file for the scene. These video segments may e.g. be associated with one or two positions in the manifest file closest to the entry point and/or positions in the field of view of the user. The entry point may be used by the video processing device to determine a correspondence between the real user position and the position within the video scene. It should be appreciated that the first position for the scene does not need to correspond with the entry point in the video scene.

The exit point defines where the video scene can be exited, and may be used by the video processing device to retrieve a new manifest file as disclosed herein.

In one embodiment, the server system is configured to analyze requests for omnidirectional or volumetric video segments from one or more video processing devices and to adapt the manifest file in accordance with these requests. The embodiment facilitates optimization of the manifest file and/or optimization of processing by the video processing device. It should be noted that the adaptation of the manifest file may comprise supplementing a root manifest file with additional information in the root manifest file or providing the additional information as a supplement to the root manifest file. The video processing device may either request the adapted manifest file (e.g. because of a validity time expiring for the manifest file) or obtain the adapted manifest file from the server system, e.g. by a push process.

In one embodiment, the server system is configured to generate a synthesized video segment fora particular position for the scene on the basis of the requests and to adapt the manifest file (e.g. add information to the manifest file or send information as a supplement to the manifest file) or send information alongside the manifest file) to include the particular position (which may be a viewing extent) and a resource locator associated with the particular position to enabling retrieval of the synthesized video segment. The embodiment allows the creation, possibly temporarily, of a video segment at the server system that can be retrieved by video processing devices directly from the server system instead of having to generate a synthesized view by each of the video processing device for itself. In this manner, video processing devices implicitly offload processing requirements to the server system and enable the server system to distribute the synthesized view to a plurality of video processing devices as if it were a pre-rendered video segment recorded by a camera at a new position for the scene.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 3 is a schematic illustration of a video processing device according to a disclosed embodiment;

FIG. 4 is a flow chart showing steps of a computer-implemented method of a video processing device for rendering a frame of a video segment;

DETAILED DESCRIPTION OF THE DRAWINGS

Figure 1:
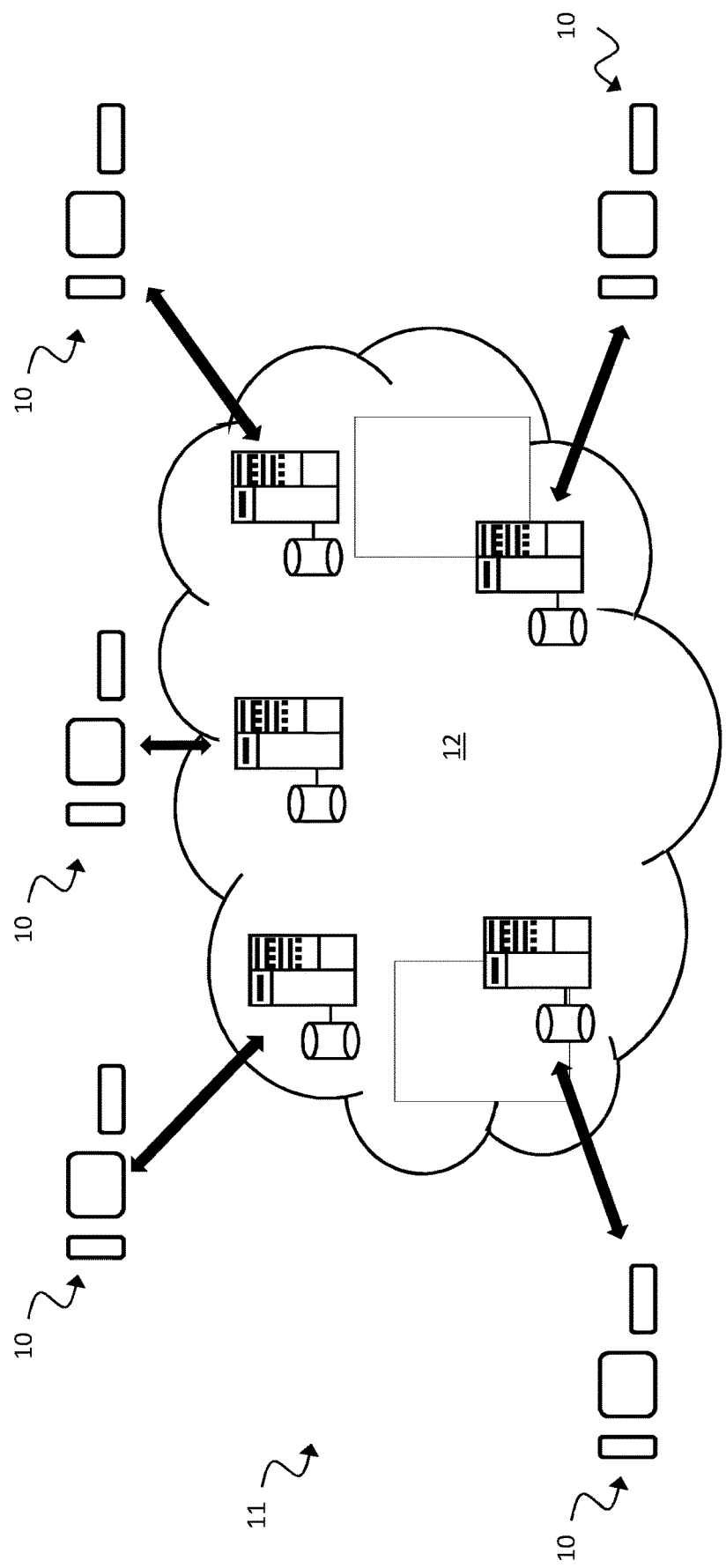
FIG. 1 is a schematic illustration of a video streaming system comprising a server system providing a content delivery network for distributing omnidirectional or volumetric video segments to a plurality of video processing devices according to a disclosed embodiment.

FIG. 1 is a schematic illustration of video processing devices 10 in a video streaming system 11 comprising a server system 12 providing a content delivery network for distributing omnidirectional or volumetric video segments to a plurality of video processing devices 10. Server system 12 may also be located at a different location, e.g. in a video processing device 10. Video processing devices 10 represent devices configured for processing video segments in order to generate or show or stream video content to a user. Examples of such devices include mobile devices or stationary devices, such as smart phones, glasses, watches, head mountable displays, laptops, gaming consoles, television sets, displays, etc.

Streaming technologies that may be used for streaming video content to the video processing devices 10 include MPEG-DASH and HTTP Live Streaming (HLS) that specify adaptive bitrate streaming using a manifest file and video segments and MPEG-CMAF defining encoding and packaging of the segmented objects. CMAF is an ISO standard developed by MPEG harmonizing codec profiles and segment formats for MPEG-DASH and HLS. HTTP Adaptive Streaming (HAS) can be used for streaming the video segments to the video processing devices 10 in the content delivery network (CDN) of FIG. 1. Using CDN and HAS for delivery of the video segments provide for a stateless nature and scalability of the server system 12.

HAS allows the video streaming system 11 to work under varying network conditions on a best-effort service base. The captured content is encoded in various qualities and typically announced via the manifest file to the video processing device 10. The video processing device 10 is capable of estimating the instantaneous throughput with the server system 12 and selects the quality fitting the estimated instantaneous throughput. When the network conditions deteriorate, the video processing device (temporarily) selects a lower bitrate representation of the content providing a lower quality experience to the user to prevent pausing or aborting the application.

The video segments in the present disclosure comprise a plurality of video frames and are temporal segments of the full video capture of the scene that can be played back sequentially before the last segment is received. The video processing device 10 can retrieve these video segments based on information provided in the manifest file in a manner known to the person skilled in the art. The video processing device 10 is configured to switch from one quality to another at certain points in the media time line.

The concatenation of subsequent video segments from different bit streams constitutes a valid bit stream.

Figure 2B:
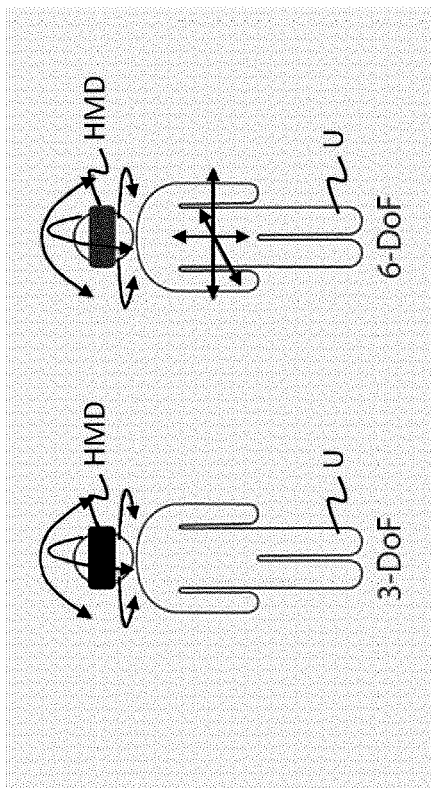
FIG. 2B is a schematic top view illustration of a user of a video processing device experiencing a video scene captured in the capturing process of FIG. 2A.
Figure 2C:
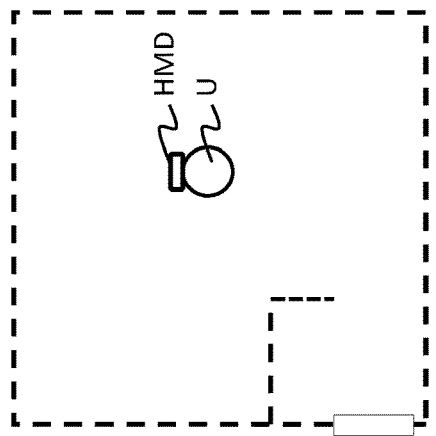
FIG. 2C is an illustration of degrees of freedom (DoF) experienced by the user in the video scene of FIG. 2B.
Figure 2A:
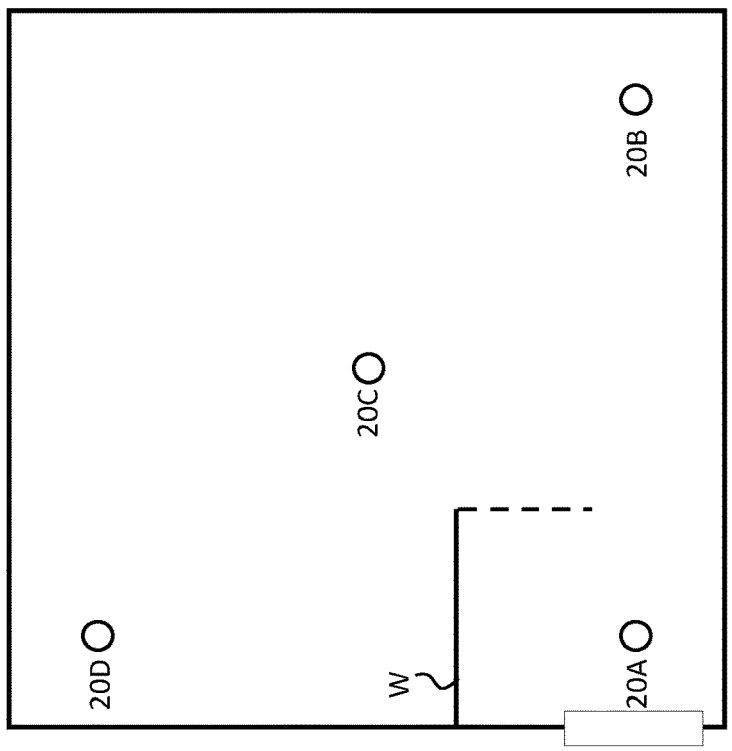
FIG. 2A is a representation of a capturing process for capturing a scene using omnidirectional and/or volumetric capturing devices.

FIG. 2A is a top-view representation of a capturing process for capturing a scene using omnidirectional and/or volumetric capturing devices 20A-20D, such as cameras. Cameras 20A-20D are deployed in a particular space and may record omnidirectional (i.e. 360 degree) video or volumetric (e.g. immersive) video. It should be noted that such videos may be obtained from a plurality of regular cameras for a single capturing device 20A-20D (e.g. flat RGB sensors) followed by post image processing techniques, such as stitching, to simulate the capture of a omnidirectional or volumetric video. Such camera arrangements are understood to constitute a single camera 20A-20D in the present disclosure. Cameras 20A-20D are not necessarily deployed in the same plane, but may e.g. be placed at different heights in a room. As shown in FIG. 2A, the space may contain one or more obstructions, such as a wall W. Wall W has an non-transparent (opaque) portion through which no visual light can pass so that camera's 20A and 20D cannot see each other. Wall W also has a transparent portion (the dashed line), e.g. a window, such that cameras 20A and 20C can see each other.

FIG. 2B shows a user U wearing a head mounted device HMD comprising a video processing device 10 (not shown in FIG. 2B). Video segments are streamed from the server system 12 to present the scene recorded by cameras 20A-20D in FIG. 2A as a video scene, shown by the dashed lines in FIG. 2B. It should be appreciated that user U is not in the same space as where the scene was recorded (as shown in FIG. 2A) and the dimensions of the space may be completely different from the recorded space in FIG. 2A. As will be explained in further detail with reference to FIGS. 3-7, the video processing device 10 has no awareness of the dimensions of the scene watched by the user U. A large city or an 8 m$^2$ room would require the same amount of data to be described as long as the same number of camera positions is used in the manifest file.

As mentioned above, cameras 20A-20D may record omnidirectional video from a stationary position as indicated in FIG. 2A. Hence, user U in FIG. 2B would in principle be able to experience three degrees of freedom (3 DoF) when his position in FIG. 2B in the video scene matches the position of one of the cameras 20A-20D of the recorded scene of FIG. 2A. These three degrees of freedom refer to rotations of the head of the person, commonly referred to as yaw, pitch and roll, as shown in the left-hand figure of FIG. 2C. Any movement away from the exact camera position by the user U would in principle result in a distorted image. However, video processing device 10 may be configured to correct the images by conventional image warping operations such as zooming into and shifting of the image such that small movements are allowed. The line, area or volume over which the video processing device 10 or user U may move while such conventional image warping operations are carried out is referred to in the present disclosure as the viewing extent.

One embodiment of the present disclosure allows the user to move outside this viewing extent while still allowing the video processing device 10 to render views for the user U to enjoy seamless video by synthesizing video segments or frames thereof. In this manner, user U will be able to enjoy more degrees of freedom (e.g. 4, 5 or 6 degrees of freedom (6 DoF), as illustrated in the right-hand figure in FIG. 2C) although the recorded video segments are recorded by omnidirectional cameras 20A-20D. A synthesized view may also be generated when the user is within the viewing extent to increase the quality of the view, e.g. by using a model description or by using one or more frames of another viewing extent.

Cameras 20A-20D in FIG. 2A may also be able to record volumetric video, i.e. video that intrinsically allows a user to move away from the camera position, e.g. 1 meter from the camera position. To that effect, the cameras 20A-20D may record a volume with volumetric media capture technologies such as point clouds, meshes with textures and light fields as known in the art. Also for volumetric video, the video processing device 10 according to an embodiment of the present disclosure allows to extend the number of degrees of freedom or movement range from the camera position using synthesizing.

FIG. 3 is a schematic illustration of a video processing device 10 for processing a manifest file and omnidirectional or volumetric video segments retrieved from server system 12.

The video processing device 10 contains various components, including a display 30 to present the video scene to the user U, a processor 31 that is described in further detail below, memory and storage 32 and a network connection means 33. It should be appreciated that one or more of these components may be embodied in a single device or may be distributed over several devices as a system.

Display 30 may be a display of a gaming device, a laptop computer or desk computer, a mobile device or a wearable device such as glasses or a head mounted display, such as the head mounted display depicted in FIG. 2B.

Processor 31 contains a general purpose processor configured for running code portions for an application, such as an XR application. Processor 31 also executes functions or modules for a controller 34, an HTTP client 35 for at least retrieving video segments, an image warping function/module 36, a synthesizer 37 and a content renderer 38 for translating the image to render a view on the display 30 as shown schematically in FIG. 3.

The synthesizer may use a variety of synthesizing techniques, including techniques like "depth-image-based-rendering" DIBR where the depth information of each captured pixel is used to render a different view in relation to the captured object or "free-viewpoint-image-synthesis" where captures from multiple different viewing angles are used to create a coordinate system which will in turn be used to render views.

The video processing device 10 also comprises memory 34 to store a manifest file and one or more video segments retrieved from the server system 12 using the network connection means 33

FIG. 4 is a flow chart showing steps of a computer-implemented method of a video processing device 10 for rendering a frame of a video segment. The process may be controlled by controller 34 of the processor 31.

In step S40, the video processing device 10 has retrieved the manifest file from the server system 12 using network connection means 33 and stored the manifest file in memory 32. The manifest file may e.g. be retrieved upon starting an application or upon selecting a video for an application, e.g. when selecting an XR experience or a piece of content to watch.

Processor 31 determines a position of the user U and associates this user position with a position for the scene defined in the manifest file. The association between the user position and the position in the manifest file may be performed in several ways, including analysing differences between the position and/or determining the field of view, e.g. the view direction, of the user at a particular point in time. A more detailed example of this process will be illustrated with reference to FIGS. 6A and 6B.

In step S41, the video processing device 10 searches for the resource locator associated with the position defined for the scene in the manifest file.

In step S42, the video processing device 10 sends a request to server system 12 including the resource locator using HTTP client 35 and network connection means 33. The request results in receiving a pre-rendered video segment associated with the position in the scene so that the user can experience the scene using display 30 of the video processing device 10. The video segment is also stored (temporarily) in memory 32.

In one embodiment, the position defined for the scene is an area or volume around the camera position that captured the scene. This area or volume is referred to as a viewing extent.

Optionally, in step S43, it may appear that video processing device 10 is or is not outside of the viewing extent, in which case the position of the video processing device does not correspond with a position defined for the scene.

If the position of the video processing device 10 does correspond to the viewing extent (N exit in FIG. 4 for step S43), the video processing device 10 may optionally still generate a synthesized view in step S44 on the basis of one or more frames of the retrieved first pre-rendered omnidirectional or volumetric video segment obtained in step S42 using synthesizer module or function 37. Generation of the synthesized view in step S44 may be assisted using a model description of a part of the scene associated with the position defined for the scene, e.g. when the user is within the viewing extent. Model descriptions will be discussed in further detail below. Generation of the synthesized view in step S44 may also be assisted using one or more frames of a further omnidirectional or volumetric video segment (retrieved for example for a further position defined for the scene using a further resource locator associated with this further position) when the position of the user corresponds with the position defined for the scene, e.g. when the user is within the viewing extent. Synthesizing when the position of the user corresponds to a position defined for the scene may increase the quality of the rendered view.

Step S44 may also be skipped and a view may be rendered directly from the retrieved pre-rendered omnidirectional or volumetric segment associated with the position for the scene, possibly using image warping techniques using module 37.

Step S45 relates to the rendering of a view for a user position corresponding to a position defined for the scene in the manifest file using content renderer 38.

When viewing extents overlap for a substantial part of the scene, the video processing device is able to retrieve omnidirectional or volumetric video segments for this part of the scene dependent on the position of the user and render a suitable and seamless view for the user by the above mentioned conventional operations for each position of the user using conventional image warping techniques. As mentioned above, synthesizing on the basis of further information may further increase the quality of the rendered view.

If the position of the video processing device 10 does not correspond to, i.e. is outside of, the viewing extent (Y exit in FIG. 4), the video processing device 10 may optionally generate a synthesized view in step S46 from one or more retrieved video segments and, possibly, the model description or part thereof.

For example, the video processing device 10 may generate a synthesized view on the basis of one or more frames of the at least the retrieved pre-rendered omnidirectional or volumetric video segment in step S42. The synthesized view may be generated based on one or more frames of one, two or more pre-rendered video segments received from the server system 12. Again, the video processing device 10 may use a model description for the relevant part to generate a synthesized view on the basis of a single retrieved pre-rendered omnidirectional or volumetric video segment.

In one particular embodiment, the manifest file defines the several positions for the scene associated with several corresponding resource locators. The video processing device 10 is configured, when the position of the user does not correspond to the first position defined for the scene (e.g. when the user is outside the first viewing extent), to retrieve several omnidirectional or volumetric video segments from the server system 12 using the resource locators and HTTP client 35. Synthesizer module 37 may be applied to generate the synthesized view on the basis of the retrieved omnidirectional or volumetric video segments, e.g. by generating the synthesized view on the basis of one or more frames in the retrieved omnidirectional or volumetric video segments. The synthesized view may then be rendered using rendering module 38.

The effect of synthesizing one or more frames of different video segments enables the video processing device 10 to render views for the user allowing the user to experience more degrees of freedom when viewing the video scene than the originally received video segments would allow without synthesizing. For example, when the video processing device receives one or more omnidirectional video segments that would allow a 3 DoF (rotation only) experience, synthesizing of one or more frames of one or more of these video segments would allow generating a 4, 5 or 6 DoF experience for the user with substantially seamless continuity of the video as also shown in FIG. 2C.

Figure 5:
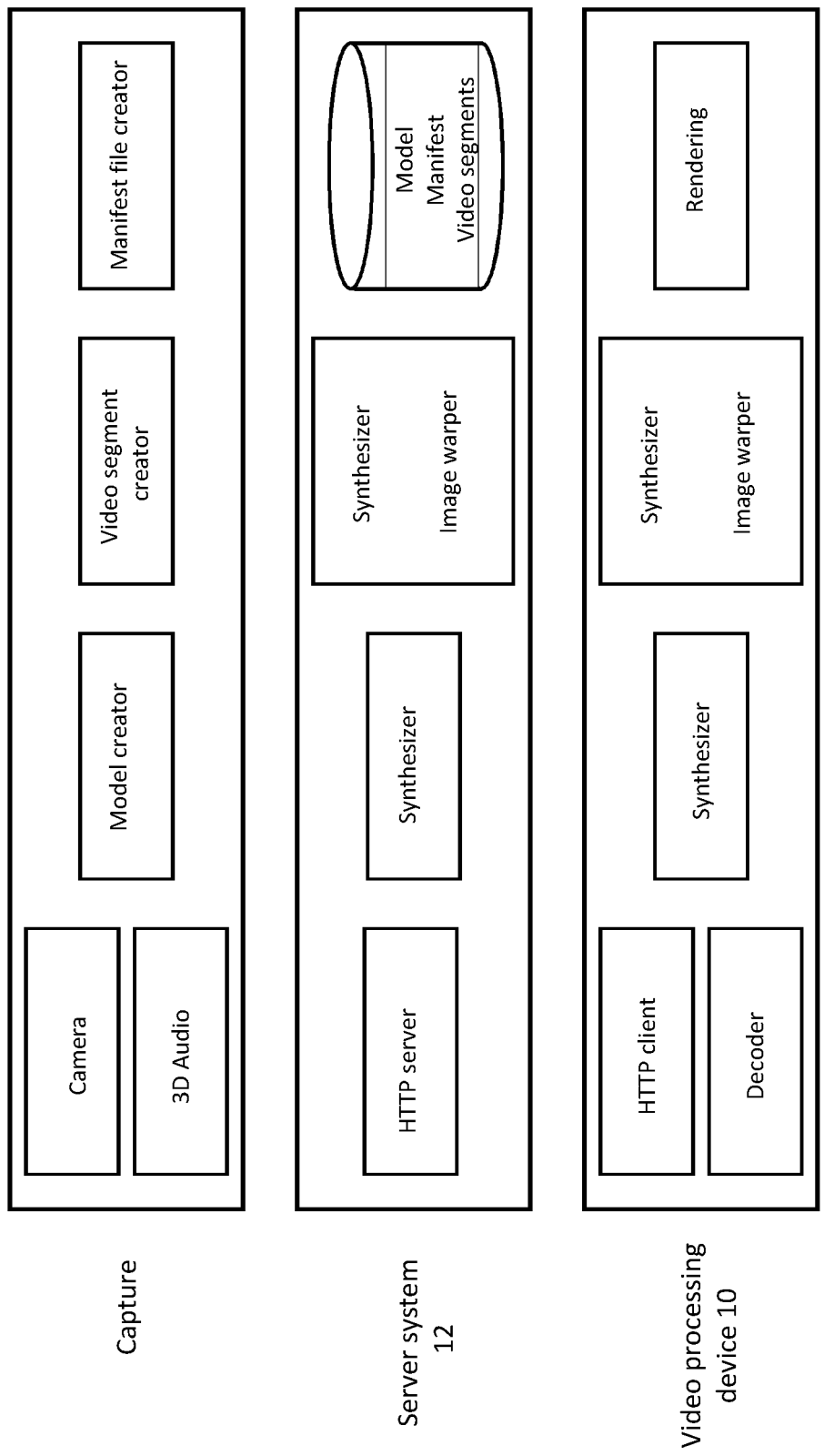
FIG. 5 is a schematic illustration of functional blocks of the capturing system, the server system and a video processing device according to a disclosed embodiment.

FIG. 5 shows components for capturing a scene, offering streaming video content via the server system 12 and consuming streaming video using video processing device 10.

The capture components comprise a plurality of cameras, such as omnidirectional cameras, and also capture sound, e.g. 3D sound. In addition, a model may be created of the scene. The model description is normally created after capturing the scene by the cameras or generating the scene by a computer. In one example, the model allows creating more accurate images but could also be used to add tactile and haptic components to the user experience. The model may contain a depth map of the captured content which is especially of interest when creating images of objects that are closer to the user so that these can be given a perception of depth. Alternatively or in addition to the depth information the model may contain metadata about the captured environment. Objects could be recognized by image recognition software. This way a prediction can be made about the visual aspects of the parts of the object that may not be captured by a camera. For example, when one side of a specific computer is recognized by image recognition software and a 3D model of the specific computer is in a database, this 3D model can be used for synthesizing.

In the present example, the capturing process also prepares the video segments (possibly in different qualities, i.e. different bitrates), i.e. creating the pre-rendered video segments, and also creates the manifest file associating positions of the captured scene with resource locators for retrieving corresponding video segments. The video segments may comprise, for example DASH media product descriptors but also direct video files such as an mp4 files.

The server system 12 has an HTTP server for processing HTTP requests from video processing devices 10 as shown in FIG. 1 and stores the model description (possible in parts retrievable by a URL pointing to this part), the manifest file and the video segments (including audio). As mentioned above, the present disclosure defines a manifest file that associates positions for a scene with omnidirectional or volumetric video segments that are retrieved from the server system when a user is in a certain position. By receiving the segments associated with a particular camera position only when requested, i.e. when the user is in a particular position, an existing streaming infrastructure can be used for XR applications applying streaming video similar to that used for HTTP Adaptive Streaming (HAS), which is advantageous for the stateless and scalable nature of the server system 12.

Server system 12 may have similar video segment processing modules as the video processing device 10 which is useful, for example, when the video processing device 10 desires to offload processing tasks to the server system 12. In one embodiment, the server system 12 is configured to analyze HTTP requests for omnidirectional or volumetric video segments from one or more video processing devices and to adapt the manifest file in accordance with these requests to optimize the manifest file.

For example statistical analysis may be used. The server system 12 may be configured to generate a synthesized video segment for a particular position for the scene on the basis of the requests from a variety of video processing devices 10 and to adapt the manifest file for the scene to include the particular position (which may be a viewing extent) and a resource locator associated with the particular position to enable retrieval of the synthesized video segment. The embodiment allows the creation, possibly temporarily, of a video segment at the server system 12 that can be retrieved by video processing devices 10 directly from the server system after having received the new manifest file instead of having to generate a synthesized view by each of the video processing devices for itself. In this manner, video processing devices 10 implicitly offload processing requirements to the server system 12 and enable the server system 12 to distribute the synthesized view to a plurality of video processing devices 10 as if it were a pre-rendered video segment recorded by a camera at a new position for the scene.

Video processing device 10 in FIG. 5 has a decoder for decoding incoming data. Further components have already been discussed with reference to FIG. 3.

A practical example of construing and using the manifest file will now be discussed in further detail with reference to FIGS. 6A and 6B.

Figures 6A, 6B:
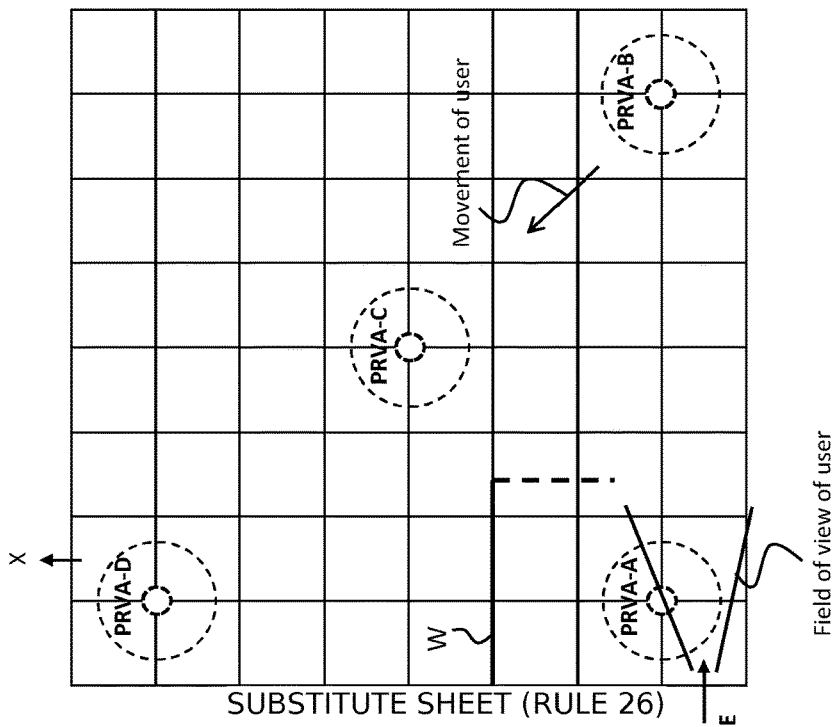
FIG. 6A shows a top-view grid applicable to the scene of FIG. 2A.
FIG. 6B depicts an exemplary portion of a manifest file according to a disclosed embodiment.

FIG. 6A shows a top-view of the scene captured in FIG. 2A over which a grid is projected as a reference for the positions of cameras 20A-20D (the small dashed circles in FIG. 6A). The viewing extents associated with the camera positions are indicated with the bigger dashed circles in FIG. 6A. These viewing extents will be referred to as PRVA in this example, so that the viewing extents of cameras 20A-20D can be indicated as PRVA-A, PRVA-B, PRVA-C and PRVA-D for purposes of this example.

FIG. 6B depicts an exemplary portion of a manifest file for this example. The video processing device 10 needs to be able to render a view for substantially each possible viewpoint, position in space and orientation, as well as over time. Not all points in space can be individually captured by a 360-camera or any camera as shown in FIG. 2A. Therefore, the manifest file contains various elements that enable and/or control synthesizing and rendering of views for substantially every (virtual) camera position.

One element pertains to a structure, also referred to as grid in the present example. The grid can have one, two or three dimensions. The grid may be composed of blocks sampling the navigation space into normalized units. In the present example, a unit of 1×1 meter is used. Whereas the camera positions in FIG. 6A are defined on the grid, it should be noted that the grid can be defined independent of the camera positions. Locations in the grid may e.g. use a format BLOCK_ROW, BLOCK_COLUMN, FRACTION_x, FRACTION_y.

The grid may be defined as a container that contains blocks. A 'start' sub-element as shown in FIG. 6B defines on what block of a grid the rendering starts when the video processing device 10 starts rendering (analogous to time t=0 for the timeline), indicated by E in FIG. 6A. This starting point or entry point enables the video processing device 10 to retrieve one or more initial omnidirectional or volumetric video segments using a resource locator associated with one or more corresponding PRVAs in the manifest file for the scene. These video segments may e.g. be associated with one or two PRVAs in the manifest file closest to the entry point and/or positions in the field of view of the user. A user may enter the space at point E in FIG. 6A and receive video segments using URLs associated with PRVA-A and PRVA-B when the field of view, indicated in FIG. 6A comprises both these PRVAs or PRVA-A and PRVA-C when the field of view comprises both these PRVAs. The entry point may be used by the video processing device 10 to determine a correspondence between the real user position and the position within the video scene.

The grid also defines an 'exit' sub-element defining on what block the grid can be exited, shown as X in FIG. 6A. The 'mpd' is referencing the 6 DoF Media Presentation Description (MPD) where the user will navigate to when taking this exit. The exit point defines where the video scene can be exited, and may be used by the video processing device to retrieve a new manifest file from the server system 12.

The navigation space is the space in which the playback of the content can take place. While the user is moving in the real space (or simulated by controller input, e.g. game controller, mouse), the video processing device 10 renders views related to different positions on the grid consistent with the (simulated) movement of the user. As analogy, the grid is the spatial equivalent of what the timeline is for a regular 2D video in the time domain, that is, it defines the extent of a media content in which a user can navigate.

Several implementations can be considered to define the area or volume restrictions for the real space in which the user is moving. The manifest file may e.g. have an explicit definition of the area or volume wherein the user is allowed to move (not shown in FIG. 6B). Alternatively, the manifest file may define transparent or non-transparent prohibitions around the area or volume to inform the user in some manner of reaching the confinements of the space. When the user reaches or exceeds the boundaries of the navigation space, the video processing device 10 may issue a navigation space indication. A variety of options also exist for the navigation space indication, including terminating video processing by the video processing device 10 as an analogy to terminating play when a movie has ended after a certain amount of time.

Another element of the manifest file pertains to the blocks of the grid. Every block of the grid may have a normalized size that can be translated into a real-world unit via a defined correspondence. For example, a 1×1 block corresponds to a 1 m×1 m navigation space, or it could also relate to 1 m×2 m. It does not have to be a uniform scale factor in all dimensions. Within a block a position, user, camera, etc., is indicated by a fractional number between 0 and 1 from the bottom left of the block according to the format mentioned above.

Yet another element of the manifest file pertains to border element. A border defines a prohibition for the user movement, e.g. wall. In addition, a border can have the property of being transparent. In this case, the PVRA on the other side of the border can be used for rendering. For example, PRVA-A and PRVA-C can both be used for rendering a view. This is the case when a wall separates two rooms for instance, in this case, the visual content from the two PVRAs is completely different and both cannot be used in combination for rendering. In FIG. 6B, PRVA-A and PRVA-D cannot be combined as they are separated by an opaque border, viz. wall W. In order to restrict the navigation space for the user, the manifest file may define a border around the navigation space to define a boundary for the navigation space, e.g. of a transparent or opaque property. The border may be used to trigger a navigation space indication when the user approaches, reaches or exceeds the border.

A still further element pertains to resource locators, such as URLs. The resource locators may refer to the geometry of the scene (such as the grid, border(s)), etc.), to (parts of) model description, as well as to video segments for each position defined for the scene.

Another element relates to positions defined for the scene, such as viewing extents, referred to as PRVAs in this example. A PRVA is construed with an omnidirectional or volumetric camera in its centre capturing 360 degrees resp. a particular volume of the environment. All areas which are not captured by a PRVA are areas wherein the video processing device 10 performs synthesizing.

More particularly, as shown in the exemplary manifest file part of FIG. 6B, each PRVA is identified by an id, which can be any letter or number combination. The 'url' is a resource locator pointing to a resource containing the video segment for that PRVA, e.g. a DASH MPD file or an mp4 file. 'mimeType' indicates the mime type of the file available at the URL 'url'. It could be a MPEG DASH MPD like in this example or directly a video in which case the mime type would be 'video/mp4'.

The 'model' contains a URL to a model that can assist in synthesizing of a view, e.g. it can provide the parameters to synthesize the view according to a given algorithm.

The 'offset' is provided because the presentation-time-stamp (PTS) can differ in time. Time may be expressed in nanoseconds. For each field a property 'offset' is available to indicate the offset of the start time of the individual block stream relative to a master PRVA indicated by the attribute @masterTimeline.

As shown in FIG. 6B, the manifest file merely describes the position of cameras with respect to a navigation of the user and the extent of the spatial navigation of the user carrying the video processing device 10. The video processing device 10 does not need an awareness of the dimension of the video scene watched by the user U. The complexity of a real-world scene, thousands of objects, points, lightnings sources, etc., may be hidden to the video processing device 10. This way all the functionalities provided by DASH, like Adaptive Bit Rate, can be used to provide a 6 DoF experience to the user U.

In FIG. 6A, also combining video segments when moving from PRVA-B and PRVA-C is displayed. Because of the wide capture angle of the omnidirectional cameras everything that is captured in PRVA-B is also captured by PRVA-C (when there are no obstructions like walls or other objects). When the video processing device 10 moves along the arrow PRVA-B is enhanced with PRVA-C to obtain more detail in the view by requesting PRVA-C.

Figure 7:
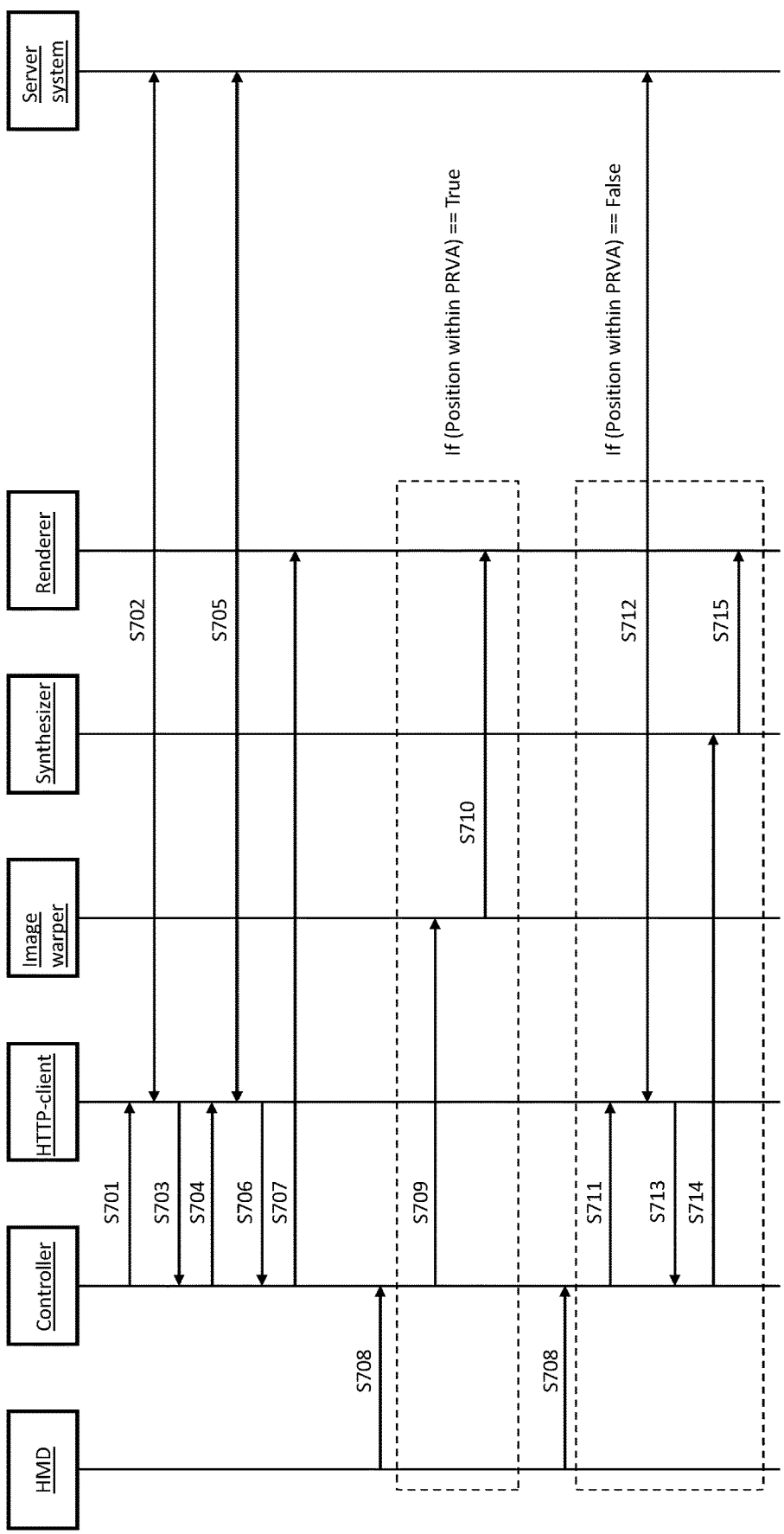
FIG. 7 is an example of a streaming process between a video processing device and a server system.

FIG. 7 is an example of a streaming process between a video processing device 10 and a server system 12. The video processing device 10 is part of a head mounted device HMD in this non-limiting example. Components of the video processing device 10 shown in FIG. 7 (controller, HTTP client, image warper, synthesizer, renderer) have already been described above.

In steps S701-S703, the video processing device 10 retrieves the manifest file by sending an HTTP Get request to the server system 12. The manifest file contains the grid and defines an entry point to allow the controller to determine which video segment(s) must be requested first by the video processing device 10. The video processing device 10 requests and receives the video segment(s) in steps S704-S706. In step S707, the controller provides the video segment to the renderer to render a view for the user corresponding to one or more frames of the received video segment associated with the entry point for the scene.

When the user U wearing the HMD moves, this is detected by the video processing device 10 in steps S708, two situations may arise as illustrated by the dashed boxes in FIG. 7. The HMD has a tracking device to detect and signal the orientation and position to the controller.

If the HMD is or stays inside a viewing extent, e.g. within the PRVA, the video processing device 10, or more particularly the controller thereof changes the view using the image warper by zooming or shifting the view as shown in step S709 using the retrieved pre-rendered video segments. Possibly, synthesizing may be performed to some extent as described in relation to step S44 of FIG. 4 to provide a higher quality view. The view is rendered in step S710.

When the HMD moves outside the viewing extent, e.g. outside the PRVA, the controller may e.g. request a further video segment in steps S711-S713 corresponding to a viewing extent, such as PRVA-B. PRVA-B may e.g. be selected because it is closest to the PRVA that was just left by the video processing device and is in the direction of movement. This video segment for PRVA-B may now be used together with the video segment for PRVA-A to synthesize the missing views between the PRVAs in step S714 using the synthesizer. The weight of the camera source and the quality of the view may depend on the position of the video processing device in relation to the camera. For example, when the video processing device is closer to PRVA-A associated with camera 20A than to PRVA-B associated with camera 20B, high resolution pre-rendered video segments captured by camera 20A will be used and no or low-resolution content from camera 20B will be requested and vice versa. The synthesized view is rendered in step S715.

Synthesizing of video segments, or frames thereof, occurs for a specific time and a point in the grid. The synthesizing of the views can also happen on the server system 12 by sending the position and time from the video processing device 10 to the server system 12. This happens for example when the video processing device 10 cannot synthesize frames in real time.

Figure 8:
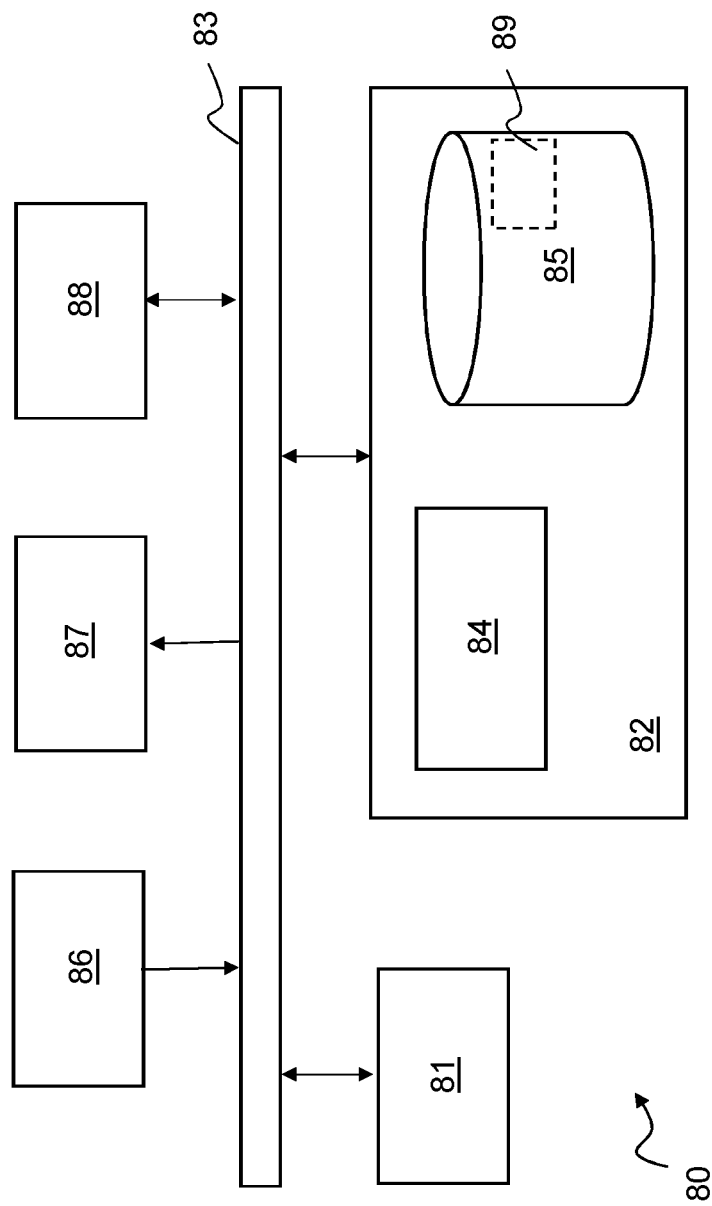
FIG. 8 depicts a processing system according to an embodiment for a video processing device or a server system.

FIG. 8 depicts a block diagram illustrating an exemplary processing system according to a disclosed embodiment, e.g. a video processing system and/or a server system. As shown in FIG. 8, the processing system 80 may include at least one processor 81 coupled to memory elements 82 through a system bus 83. As such, the processing system may store program code within memory elements 82. Further, the processor 81 may execute the program code accessed from the memory elements 82 via a system bus 83. In one aspect, the processing system may be implemented as a computer that is suitable for storing and/or executing program code. It should be appreciated, however, that the processing system 80 may be implemented in the form of any system including a processor and a memory that is capable of performing the functions described within this specification.

The memory elements 82 may include one or more physical memory devices such as, for example, local memory 84 and one or more bulk storage devices 85. The local memory may refer to random access memory or other non-persistent memory device(s) generally used during actual execution of the program code. A bulk storage device may be implemented as a hard drive or other persistent data storage device. The processing system 80 may also include one or more cache memories (not shown) that provide temporary storage of at least some program code in order to reduce the number of times program code must be retrieved from the bulk storage device 85 during execution.

Input/output (I/O) devices depicted as an input device 86 and an output device 87 optionally can be coupled to the processing system. Examples of input devices may include, but are not limited to, a space access keyboard, a pointing device such as a mouse, or the like. Examples of output devices may include, but are not limited to, a monitor or a display, speakers, or the like. Input and/or output devices may be coupled to the processing system either directly or through intervening I/O controllers.

In an embodiment, the input and the output devices may be implemented as a combined input/output device (illustrated in FIG. 8 with a dashed line surrounding the input device 86 and the output device 87). An example of such a combined device is a touch sensitive display, also sometimes referred to as a "touch screen display" or simply "touch screen". In such an embodiment, input to the device may be provided by a movement of a physical object, such as e.g. a stylus or a finger of a person, on or near the touch screen display.

A network adapter 88 may also be coupled to the processing system to enable it to become coupled to other systems, computer systems, remote network devices, and/or remote storage devices through intervening private or public networks. The network adapter may comprise a data receiver for receiving data that is transmitted by said systems, devices and/or networks to the processing system 80, and a data transmitter for transmitting data from the processing system 80 to said systems, devices and/or networks. Modems, cable modems, and Ethernet cards are examples of different types of network adapter that may be used with the processing system 80.

As pictured in FIG. 8, the memory elements 82 may store an application 89. In various embodiments, the application 89 may be stored in the local memory 84, the one or more bulk storage devices 85, or apart from the local memory and the bulk storage devices. It should be appreciated that the processing system 80 may further execute an operating system (not shown in FIG. 7) that can facilitate execution of the application 89. The application 89, being implemented in the form of executable program code, can be executed by the processing system 80, e.g., by the processor 81. Responsive to executing the application, the processing system 80 may be configured to perform one or more operations or method steps described herein. The application may be an application offering extended reality views.

In one aspect of the present invention, one or more components of the video processing device as depicted in FIG. 3 may represent processing system 80 as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 81 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the claims. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A video processing device comprising a processor for processing a manifest file for video streaming for a user, the manifest file comprising at least:
   a plurality of capturing device positions, each capturing device position associated with a corresponding capturing device, the plurality of capturing device positions defined for a scene associated with pre-rendered omnidirectional or volumetric video segments stored on a server system; and
   a plurality of resource locators for retrieving omnidirectional or volumetric video segments from the server system, wherein each resource locator of the plurality of resource locators is associated with a capturing device position defined for the scene, wherein the video processing device is configured to associate a position of the user with a first capturing device position defined for the scene in the manifest file to retrieve a first pre-rendered omnidirectional or volumetric video segment associated with the first capturing device position using a first resource locator from the manifest file.

2. The video processing device according to claim 1, wherein one or more capturing device positions in the manifest file are associated with a viewing extent within which the processing device is capable of processing the retrieved omnidirectional or volumetric video segment to render a view for the user.

3. The video processing device according to claim 1, wherein the video processing device is configured to generate a synthesized view or receive a generated synthesized view for the user, wherein the synthesized view is generated on the basis of one or more frames of at least the retrieved first pre-rendered omnidirectional or volumetric video segment, and wherein the synthesized view is further generated on the basis of at least one of:
a model description of a part of the scene associated with the first capturing device position when the position of the user corresponds to the first capturing device position defined for the scene; and
one or more frames of a second omnidirectional or volumetric video segment; and
one or more frames of the retrieved first pre-rendered omnidirectional or volumetric video segment when the position of the user does not correspond to first capturing device position defined for the scene.

4. The video processing device according to claim 3, wherein the manifest file defines the first capturing device position associated with the first resource locator and a second capturing device position associated with a second resource locator and wherein, when the position of the user does not correspond to the first capturing device position defined for the scene, the video processing device is configured to retrieve at least one second omnidirectional or volumetric video segment from the server system using the second resource locator associated with the second capturing device position in the manifest file and to generate the synthesized view for the user on the basis of one or more frames of the retrieved first and second omnidirectional or volumetric video segments.

5. The video processing device according to claim 3, wherein the manifest file defines a prohibition to use frames of first and second video segments in combination to generate the synthesized view, wherein, optionally, the prohibition is a border type element in the manifest file that indicates to the video processing device to combine or not combine the first and second video segments, or frames thereof, to generate the synthesized view.

6. The video processing device according to claim 3, wherein the video processing device is configured to retrieve at least a part of a model description of the scene associated with at least one capturing device position in the manifest file and wherein the video processing device is further configured to generate the synthesized view for the user on the basis of at least one or more frames of the first pre-rendered omnidirectional or volumetric video segment and at least the retrieved part of the model description.

7. The video processing device according to claim 1, wherein the manifest file defines an area or volume within which the user is allowed to move and wherein the video processing device uses said area or volume as a navigation space indication.

8. A non-transitory computer-readable medium comprising a manifest file for processing a video stream by a video processing device, wherein the manifest file contains:
a plurality of capturing device positions, each capturing device position associated with a corresponding capturing device, the plurality of capturing device positions defined for a scene that are associated with pre-rendered omnidirectional or volumetric video segments stored on a server system; and
a plurality of resource locators for retrieving omnidirectional or volumetric video segments from the server system, wherein each resource locator of the plurality of resource locators is associated with a capturing device position defined for the scene;
wherein the non-transitory computer-readable medium, upon execution by a processor, causes the video processor device to retrieve the pre-rendered omnidirectional or volumetric video segments stored on the server system.

9. The non-transitory computer-readable medium according to claim 8, wherein each capturing device position in the manifest file is associated with a viewing extent.

10. The non-transitory computer-readable medium according to claim 8, wherein the manifest file defines:
a first resource locator associated with a first capturing device position in the scene, wherein the first resource locator points to the first pre-rendered omnidirectional or volumetric video segment at the server system;
a second resource locator associated with a second capturing device position in the scene, wherein the second resource locator points to the second pre-rendered omnidirectional or volumetric video segment at the server system.

11. The non-transitory computer-readable medium according to claim 10, wherein the manifest file defines a prohibition to use frames of the first and second video segments in combination, wherein, optionally, the prohibition is defined as a border type element indicating whether or not the first and second video segments, or frames thereof, may be combined.

12. The non-transitory computer-readable medium according to claim 8, wherein the manifest file further contains at least one of:
information associated with a model description of the scene, such as resource locators to a model description part associated with a capturing device position defined for the scene;
at least one of an entry point and an exit point of the video scene; and
an area or volume within which a user of a video processing device is allowed to move.

13. A server system having access to a manifest file, wherein the manifest file contains:
a plurality of capturing device positions, each capturing device position associated with a corresponding capturing device, the plurality of capturing device positions defined for a scene that are associated with pre-rendered omnidirectional or volumetric video segments stored on a server system; and
a plurality of resource locators for retrieving omnidirectional or volumetric video segments from the server system, wherein each resource locator of the plurality of resource locators is associated with a capturing device position defined for the scene; wherein the server system is further configured to receive requests for omnidirectional or volumetric video segments identified by the resource locators in the manifest file from a video processing device.

14. The server system according to claim 13, wherein the server system is configured to analyze requests for omnidirectional or volumetric video segments from one or more video processing devices and to adapt the manifest file in accordance with these requests.

15. The server system according to claim 14, wherein the server system is configured to generate a synthesized video segment for a particular position in the video scene on the basis of the requests and to adapt the manifest file to include the particular position and a resource locator associated with the particular position to enabling retrieval of the synthesized video segment.

16. A video streaming system comprising a server system according to claim 13 and a video processing device.

17. The video processing device according to claim 3, wherein the synthesized view is further generated on the basis of one or more frames of a second omnidirectional or volumetric video segment, retrieved for a second capturing device position defined for the scene using a second resource locator associated with the second position when the position of the user corresponds to the first capturing device position defined for the scene.

* * * * *

UNITED STATES PATENT AND TRADEMARK OFFICE
CERTIFICATE OF CORRECTION

| | | |
|---|---|---|
| PATENT NO. | : 12,335,553 B2 | Page 1 of 1 |
| APPLICATION NO. | : 17/788225 | |
| DATED | : June 17, 2025 | |
| INVENTOR(S) | : Brandt et al. | |

It is certified that error appears in the above-identified patent and that said Letters Patent is hereby corrected as shown below:

On the Title Page

Item (71) Applicants: Line 5, delete:
"The Hague (NL)"
And insert:
-- 's-Gravenhage (NL) --.

Signed and Sealed this
Twenty-fifth Day of November, 2025

John A. Squires
*Director of the United States Patent and Trademark Office*